US009607011B2

(12) United States Patent
Sud et al.

(10) Patent No.: US 9,607,011 B2
(45) Date of Patent: Mar. 28, 2017

(54) TIME-SHIFTING IMAGE SERVICE (71) Applicant: Intel Corporation, Santa Clara, CA (US)

(72) Inventors: Shivani A. Sud, Santa Clara, CA (US); Robert C. Knauerhase, Portland, OR (US); Dzung D. Tran, Beaverton, OR (US); Radia Perlman, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 397 days.

(21) Appl. No.: 13/719,673

(22) Filed: Dec. 19, 2012

(65) Prior Publication Data
US 2014/0172906 A1 Jun. 19, 2014

(51) Int. Cl.
*G06F 17/30* (2006.01)

(52) U.S. Cl.
CPC .............................. *G06F 17/30265* (2013.01)

(58) Field of Classification Search
CPC ....... G06F 2211/1028; G06F 17/30194; G06F 3/0641
USPC .................................................. 707/821, 828
See application file for complete search history.

(56) References Cited

U.S. PATENT DOCUMENTS

| 6,263,089 B1* | 7/2001 | Otsuka et al. ................ 382/107 |
| 6,456,727 B1* | 9/2002 | Echizen ................ G06T 1/0064 382/100 |
| 6,563,935 B1* | 5/2003 | Echizen ................ G06T 1/0064 235/469 |
| 6,819,356 B1 | 11/2004 | Yumoto |
| 7,573,593 B2* | 8/2009 | Hart et al. .................... 358/1.15 |
| 7,664,601 B2* | 2/2010 | Daly, Jr. ........................... 702/3 |
| 7,970,240 B1* | 6/2011 | Chao ................. G06F 17/30274 382/305 |
| 8,558,921 B2* | 10/2013 | Walker et al. ............. 348/231.3 |
| 2003/0006928 A1* | 1/2003 | Szeto et al. ..................... 342/26 |

(Continued)

FOREIGN PATENT DOCUMENTS

| CN | 104813651 A | 7/2015 |
| JP | 2007-265259 A | 10/2007 |

(Continued)

OTHER PUBLICATIONS

International Search Report and Written Opinion received for PCT Patent Application No. PCT/US2013/073587, mailed on Mar. 26, 2014, 14 pages.

(Continued)

*Primary Examiner* — Baoquoc N To
(74) *Attorney, Agent, or Firm* — Jordan IP Law, LLC (57) ABSTRACT

Methods and systems may provide for obtaining a query image of a scene, wherein the query image includes embedded information and represents the scene at a time of capture. The embedded information may include location data and perspective data. Additionally, user input may be received, wherein the user input identifies a different time than the time of capture. A time-shifted image of the scene may be obtained based on the user input and the embedded information in the query image. Crowd sources and/or other public information sources may also be used to obtain the time-shifted image. In one example, the time-shifted image represents the scene at the different time.

21 Claims, 6 Drawing Sheets

(56) References Cited

U.S. PATENT DOCUMENTS

| | | | |
|---|---|---|---|
| 2003/0107643 A1* | 6/2003 | Yoon | G03B 35/20 348/47 |
| 2003/0189731 A1* | 10/2003 | Chang | G06F 3/03542 358/3.28 |
| 2004/0174434 A1* | 9/2004 | Walker et al. | 348/211.3 |
| 2004/0239550 A1* | 12/2004 | Daly, Jr. | 342/26 B |
| 2005/0068572 A1* | 3/2005 | Hart et al. | 358/1.15 |
| 2006/0078315 A1* | 4/2006 | Wada et al. | 386/117 |
| 2006/0114338 A1* | 6/2006 | Rothschild | G06F 17/30265 348/231.99 |
| 2007/0043748 A1* | 2/2007 | Bhalotia | G06F 17/30265 |
| 2007/0115510 A1* | 5/2007 | Braudaway | G06T 1/005 358/3.28 |
| 2007/0242853 A1* | 10/2007 | Rodriguez | G01S 19/14 382/100 |
| 2008/0230607 A1* | 9/2008 | Etten | G06K 17/0022 235/435 |
| 2009/0231441 A1* | 9/2009 | Walker et al. | 348/207.1 |
| 2010/0232656 A1 | 9/2010 | Ryu | |
| 2010/0250581 A1* | 9/2010 | Chau | 707/769 |
| 2011/0173565 A1* | 7/2011 | Ofek | G06T 5/50 715/790 |
| 2011/0218864 A1* | 9/2011 | Pentz | G06Q 30/0275 705/14.71 |
| 2012/0120100 A1* | 5/2012 | Chau | 345/632 |
| 2012/0218431 A1 | 8/2012 | Matsuoto et al. | |
| 2013/0022202 A1* | 1/2013 | Stroud | H04W 12/02 380/270 |
| 2013/0314566 A1* | 11/2013 | Walker et al. | 348/231.3 |
| 2013/0325896 A1* | 12/2013 | Hunt | G06F 17/30268 707/776 |
| 2014/0053067 A1* | 2/2014 | Tkatchuk | G06F 3/04845 715/252 |
| 2014/0101174 A1* | 4/2014 | Tsai | G06F 7/24 707/752 |

FOREIGN PATENT DOCUMENTS

| | | |
|---|---|---|
| JP | 2012-044251 A | 3/2012 |
| KR | 10-2009-0124711 A | 12/2009 |
| WO | 2014-099414 | 6/2014 |

OTHER PUBLICATIONS

International Preliminary Report on Patentability and Written Opinion received for PCT Patent Application No. PCT/US2013/073587, mailed on Jul. 2, 2015, 11 pages.

* cited by examiner

TIME-SHIFTING IMAGE SERVICE

BACKGROUND

Technical Field

Embodiments generally relate to image processing. More particularly, embodiments relate to the dynamic generation of time-shifted images.

Discussion

Conventional photography may involve the relatively static processes of capturing a digital image and storing the image for later viewing or editing. While more recent developments may have enabled the embedding of location data into digital images, the usage of the embedded information may be limited to mapping applications, which may also be relatively static in nature.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1A:
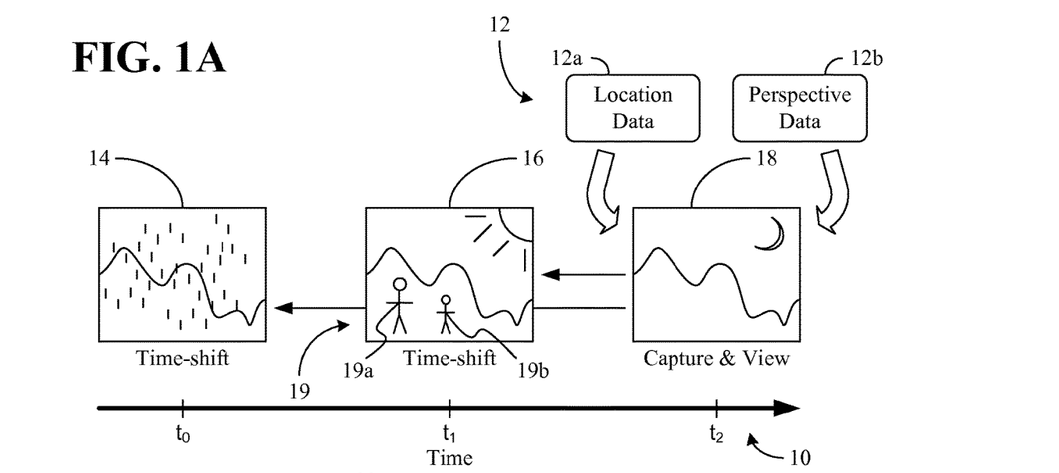
FIG. 1A is an illustration of an example of an imaging timeline for a concurrent capture and view scenario according to an embodiment.

Turning now to FIG. 1A, an imaging timeline 10 is shown in which information 12 (12a, 12b) such as location data 12a and perspective data 12b is embedded into a digital image 18 of a scene captured at a time of capture (e.g., $t_2$). As will be discussed in greater detail, the embedded information 12 may enable retrieval of similar time-shifted images such as, for example, an image 14 or an image 16, wherein the images 14, 16 may also include embedded location data and perspective data. In the illustrated example, the image 14 represents the same scene at an earlier time (e.g., $t_0$), and the image 16 represents the same scene at another earlier time (e.g., $t_1$). More particularly, a user may view the image 18 at the time of capture and use the viewed image 18 as a query image to retrieve time-shifted versions of the image 18 being viewed. As will be discussed in greater detail, the user may also view images after they are captured and use the viewed images to obtain time-shifted versions that represent the scene at a time either before or after the viewed image was captured.

The time-shifted images may be retrieved from a local data store, a remote imaging service, a crowd source (e.g., social networking database), a remote data store associated with a particular user, and so forth. The ability to retrieve time-shifted images from other sources may be particularly advantageous. For example, the user may be able to see what a particular scene looked like at another time (e.g., the year 1912) even though the user was not located at the scene during the other time.

Moreover, the embedded information 12 may generally facilitate the search for and retrieval of images related to the same scene. For example, the location data 12a may be obtained from a local global positioning system (GPS) of the device that captures the image 18, whereas the perspective data 12b may be obtained from a local sensor such as, for example, an accelerometer, gyroscope and/or compass of the device that captures the image 18. Comparing the embedded information 12 between images may enable a determination as to whether the images are of the same scene. Other information such as environmental data (e.g., temperature, moisture, ambient light intensity, wind speed, etc.) and personalization data (e.g., text/audio annotations, social networking comments), may also be embedded into the images 14, 16, 18. In one example, the environmental data is also used in the search and/or comparison processes, as well as for transformational algorithms to operate on the images 14, 16, 18, and so forth.

Additionally, each image 14, 16, 18 may contain relatively dynamic content as well as relatively static content. For example, the illustrated image 14 includes weather-related content (e.g., rain), the illustrated image 16 includes astronomy-related content (e.g., the sun) and subjects 19 (19a, 19b), and the illustrated image 18 includes astronomy-related content (e.g., the moon), wherein such content may be considered dynamic. On the other hand, each image 14, 16, 18 may also include static content such as the landscape. Other content such as skylines, buildings, etc., might also be considered static content. As will be discussed in greater detail, both types of content may be automatically identified (e.g., via object recognition analysis) and either included in or excluded from the time-shifted images based on the identification. Moreover, one or more of the images 14, 16, 18 may be overlaid with other images and/or content to further personalize the time-shifted image that is presented to the user.

Figure 1B:
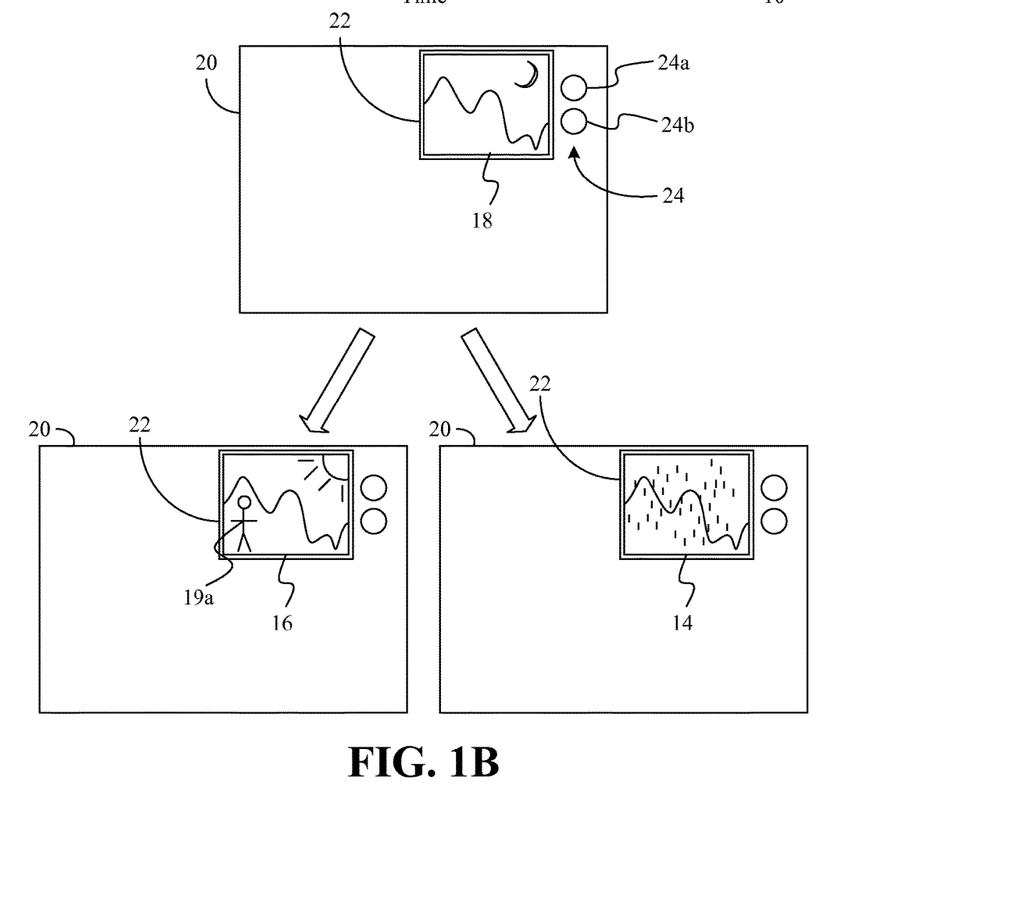
FIG. 1B is an illustration of an example of a scheme of using an image capture device to time-shift images in a concurrent capture and view scenario according to an embodiment.

FIG. 1B shows an image capture device 20 having an image preview window/display 22 that, at time $t_2$, displays the image 18 of the scene when the image capture device 20 is aimed at the scene. In the illustrated example, the user may operate one or more buttons 24 (24a, 24b) in order to input a time-shift request into the device 20, wherein the time-shift request may identify a different time than the current time. For example, the different time might correspond to the earlier time $t_0$, in which case the image 14 may be retrieved by the device 20 and output via the preview display 22. If, on the other hand, the user input (e.g., time-shift request) corresponds to the earlier time $t_1$, the image 16 may be retrieved by the device 20 and output via the preview display 22.

Of particular note is that in the illustrated example, the subject 19b (FIG. 1A) is excluded from the image 16 when it is displayed as a time-shifted image. In this regard, the subject 19b (FIG. 1A) may be identified via, for example, facial recognition or manual selection at the time of image capture (e.g., $t_1$) or at a later time, wherein the user may institute a policy that excludes recognized subjects (e.g., family and friends) before publishing/sharing the image 16 with others. Such a solution may be advantageous from a privacy standpoint. Alternatively, the displayed subject 19a might be recognized whereas the subject 19b may not be recognized, wherein the user may institute a policy to exclude subjects that are not recognized (e.g., keep only family and friends) in order to personalize the image 16 for the user in question. In either instance, object recognition may be used to customize the time-shifting experience from the perspective of the user. Moreover, the object recognition and other personalization functions may be performed by the local image capture device, a remote time-shifted image server, etc., or any combination thereof.

Figure 2A:
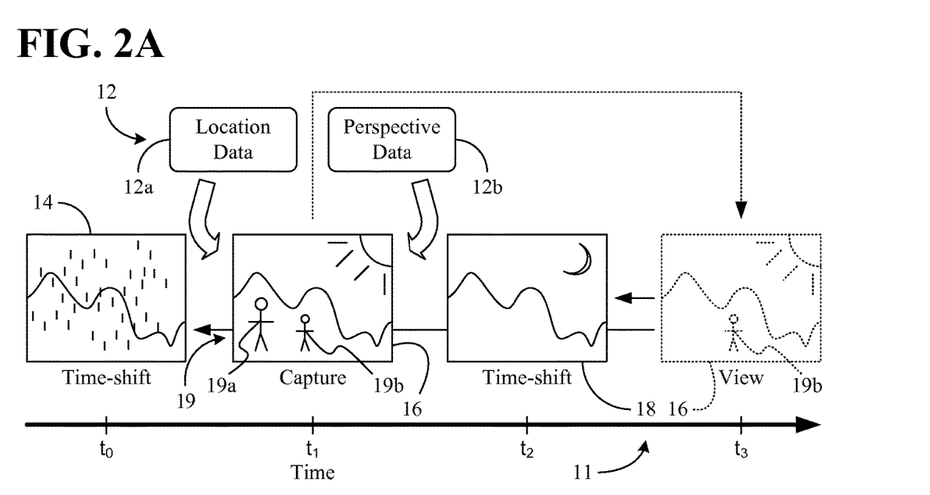
FIG. 2A is an illustration of an example of an imaging timeline for a delayed capture and view scenario according to an embodiment.

FIG. 2A shows an imaging timeline 11 in which the image 16 is captured by an image capture device at a particular time (e.g., time of capture, $t_1$) and viewed at a later time (e.g., time of viewing, $t_3$), wherein the viewing may take place on the device that captured the image 16 or on another device such as a desktop computer, notebook computer, smart tablet, smart television, and so forth. In the illustrated example, the user may request a time-shifted version of the image 16, wherein the time-shifted version might reflect the same scene at an earlier time (e.g., $t_0$) from the perspective of the time of capture or a later time (e.g., $t_2$) from the perspective of the time of capture. Indeed, the time-shift request may indicate the time of viewing (e.g., "how it looks now", $t_3$). As already noted, the time-shifted images may include or exclude certain personalization data, depending upon the circumstances.

Figure 2B:
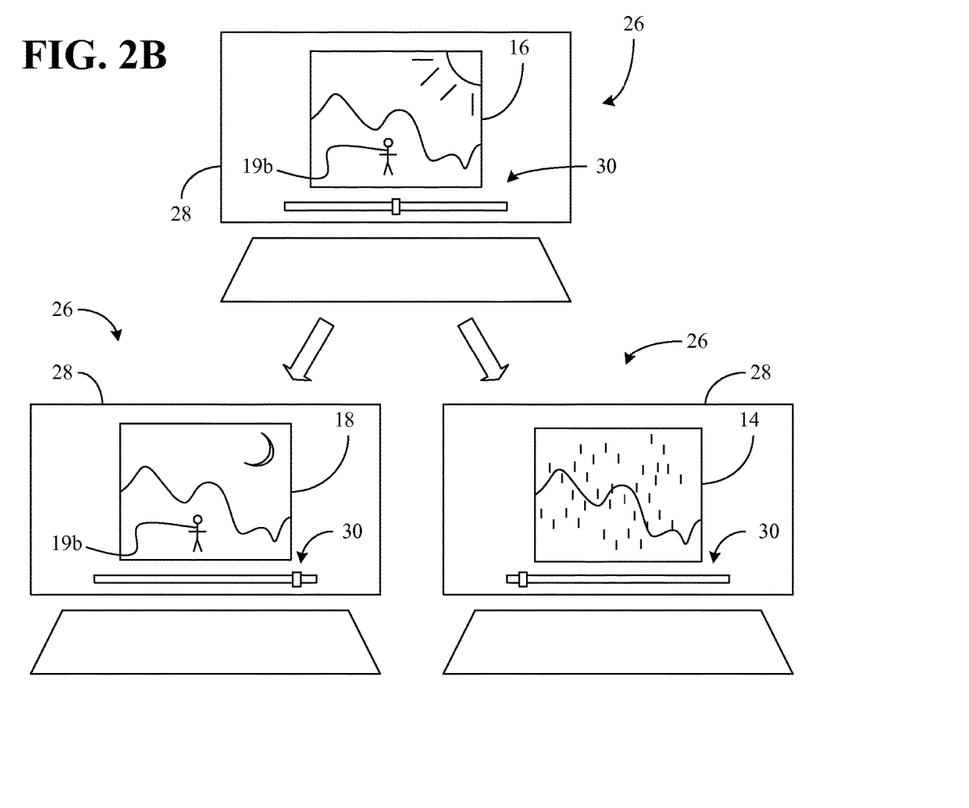
FIG. 2B is an illustration of an example of a scheme of using a viewing application to time-shift images in a delayed capture and view scenario according to an embodiment.

Turning now to FIG. 2B, a computing device 26 is shown in which a display 28 shows the image 16 of the scene at some time after the image 16 is captured (e.g., $t_3$). The illustrated display 28 also shows a slider bar 30 that enables the user to input a time-shift request into the computing device 26, wherein the time-shift request may identify a different time than the time at which the image 16 was captured. For example, the different time may correspond to the earlier time $t_0$, in which case the image 14 may be retrieved by the computing device 26 and output via the display 28. If, on the other hand, the user input (e.g., time-shift request) corresponds to the later time $t_2$, the image 18 may be retrieved and output via the display 28. In the illustrated example, the subject 19b is also overlaid on the image 18 to show what the later scene would have looked like with the subject 19b present. Other user customizations/personalizations may also be implemented.

Figure 3:
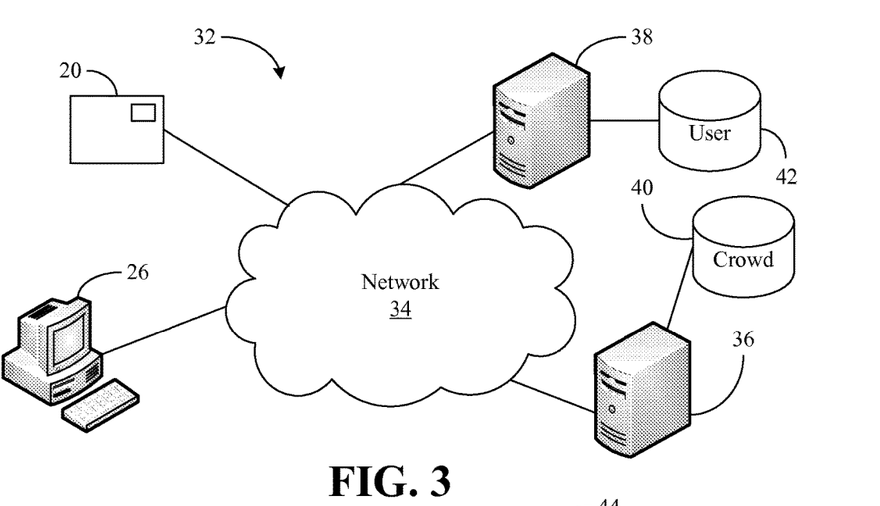
FIG. 3 is as block diagram of an example of a networking architecture according to an embodiment.

FIG. 3 shows a networking architecture 32 in which the image capture device 20 and the computing device 26 communicate over a network 34 with a server 36 and/or a server 38. One or more of the servers 36, 38 may be configured to function as time-shifted image servers. Thus, the servers 36, 38 may receive query images and time-shift requests from the image capture device 20 and/or computing device 26, and retrieve time-shifted images in response to the time-shift requests. In the illustrated example, the server 36 is coupled to a crowd database 40 (e.g., crowd source), and the server 38 is coupled to a user specific database 42.

The servers 36, 38 may also communicate with one another over the network 34 or via another appropriate connection. Accordingly, the embedded information in the query images and the associated time-shift requests may be used by the servers 36, 38 to obtain time-shifted images from the crowd database 40 and/or user specific database 42, wherein the time-shifted images contain the same scenes as the query images.

Figure 4:
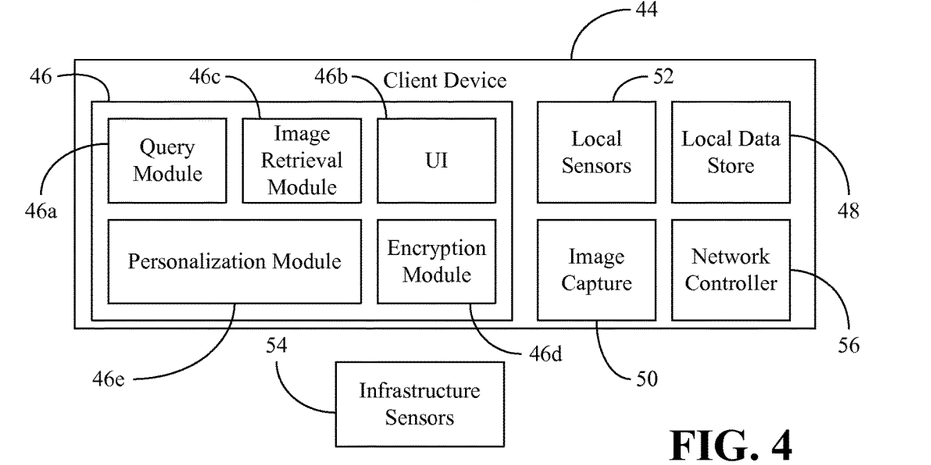
FIG. 4 is a block diagram of an example of a client device environment according to an embodiment.

Turning now to FIG. 4, a client device 44 is shown, wherein the client device 44 may be used to retrieve time-shifted images for a query image that is being captured/previewed or viewed at a time after the query image has been captured. Thus, the client device 44 may be substituted for the image capture device 20 (FIG. 2A) and/or the computing device 26 (FIG. 2B), already discussed. In the illustrated example, the client device 44 includes a logic architecture 46 (46a-46e) that is generally configured to issue query images and time-shift requests to remote servers such as, for example, the servers 36, 38 (FIG. 3). The logic architecture 46 may include a query module 46a to obtain query images of scenes, wherein the query images include embedded information and represent the scenes at particular moments in time.

The embedded information may include location data and/or perspective data, as already discussed. In one example, one or more of the query images are received from a local data store 48 (e.g., in a delayed capture and view scenario). One or more of the query images may also be received from local image capture component 50 (e.g., in a concurrent capture and view scenario). Moreover, if the images are received from the local image capture component 50, the query module 46a may use one or more local sensors 52 to add the embedded information to the query images. The embedded information may also include environmental data obtained from one or more infrastructure sensors 54. The environmental data may include, for example, temperature data, moisture data, ambient light intensity data, wind speed data, and so forth. Additionally, the embedded information may include personalization data such as text/audio annotations, social networking comments, information from public and/or crowd sources, and so forth. In this regard, the architecture 46 may include a personalization module 46e to modify captured and/or stored images with the personalization data, wherein the modification may include adding and/or deleting information from the images as instructed by the user. In one example, an encryption module 46 encrypts the embedded information so that the user may control access to the images as well as the embedded information.

The illustrated logic architecture 46 also includes a user interface (UI) 46b to receive user input identifying times that are different from the times of capture, and an image retrieval module 46c that obtains time-shifted images of the scenes based on the user input and the embedded information. The time-shifted images may represent the scenes at the different times identified in the user input, as already discussed. In one example, the image retrieval module 46c uses a network controller 56 to obtain the time-shifted images from a remote server. In particular, the image retrieval module 46c may transmit the query images with the embedded information to the remote server via the network controller 56, transmit the time-shift requests to the remote server via the network controller 56 based on the user input, and receive the time-shifted images from the remote server via the network controller 56.

Figure 5:
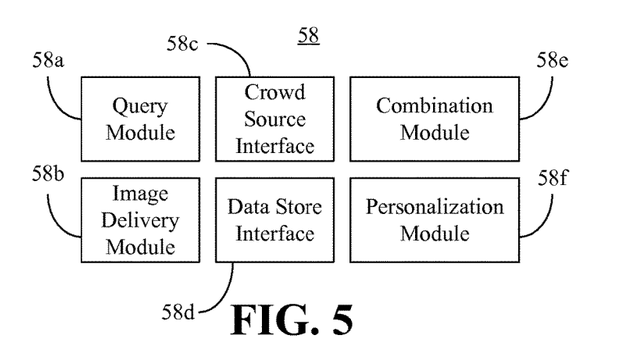
FIG. 5 is a block diagram of an example of a server logic architecture according to an embodiment.

FIG. 5 shows a logic architecture 58 (58a-58f) of a time-shifted image server such as, for example, the servers 36, 38 (FIG. 3). The logic architecture 58 may therefore generally be used to provide time-shifted images to client devices such as the client device 44 (FIG. 4), already discussed. In the illustrated example, a query module 58a receives query images of scenes, wherein each query image may include embedded information and represent the scene at a time of capture. The embedded information may include location data, perspective data, environmental data and/or personalization data, as already discussed. The query module 58a may also receive time-shift requests, wherein each time shift request identifies a different time than the time of capture. In one example, the time-shift requests are also embedded in the query images. The illustrated architecture 58 also includes an image delivery module 58b to generate responses that include the time-shifted images based on the query images and the time-shift requests.

In particular, the image delivery module 58b may use the embedded information to obtain the time-shifted images from one or more of a crowd source via a crowd source interface 58c and a data store via a data store interface 58d. In one example, the data store is associated with the user that originated the time-shift request (e.g., a particular user). The architecture 58 may also include a combination module 58e that combines a plurality of images to obtain one or more of the time-shifted images, wherein the plurality of images may include a corresponding query image. Additionally, the illustrated architecture 58 includes a personalization module 58f that is configured to conduct an object recognition analysis on the query image. The personalization module 58f may also remove one or more objects from the query image based on the object recognition analysis to obtain a personalized image, wherein the personalized image is used to obtain the time-shifted image. The object recognition analysis may also be used to add one or more objects to the time-shifted image, as already discussed.

Figure 6A:
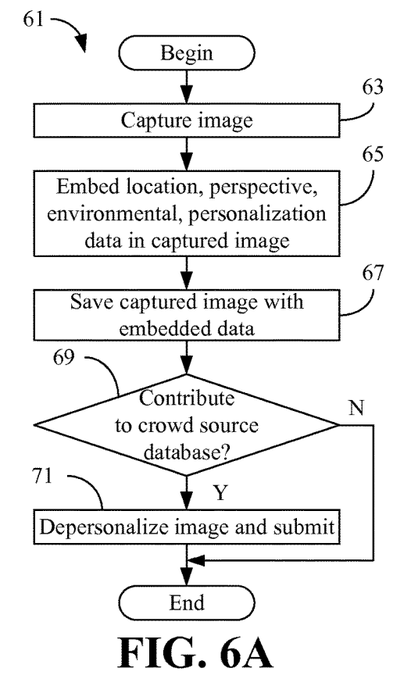
FIG. 6A is a flowchart of an example of a method of operating a client device at a time of capture according to an embodiment.

FIG. 6A shows a method 61 of operating a client device at a time of capture. The method 61 might be implemented in a client device such as, for example, the client device 44 (FIG. 4) as a set of logic/module instructions stored in a machine- or computer-readable medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 60 may be written in any combination of one or more programming languages, including an object oriented programming language such as Java, Smalltalk, C++ or the like and conventional procedural programming languages, such as the "C" programming language or similar programming languages.

Illustrated processing block 63 provides for capturing an image, wherein block 65 may involve embedding location, perspective, environmental and/or personalization data in the captured image. The captured image may be saved at block 67 along with the embedded data. Additionally, a determination may be made at block 69 as to whether a contribution will be made to a crowd source database such as, for example the database 40 (FIG. 3), already discussed. The determination at block 69 may involve, for example, prompting a user for authorization, checking one or more user profile settings, and so forth. If a contribution is to be made, illustrated block 71 depersonalizes the captured image. Depersonalization may include, for example, removing user specific data such as names, addresses, etc., wherein the specifics of the depersonalization may be dictated by the user, a default configuration, and so forth. If, on the other hand, a crowd source contribution is not being made, the method 61 may terminate.

Figure 6B:
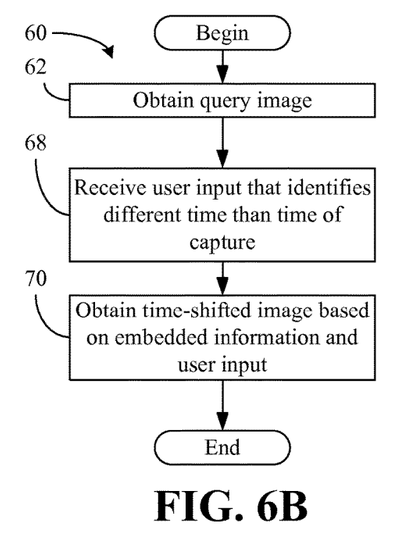
FIG. 6B is a flowchart of an example of a method of operating a client device at a time of viewing according to an embodiment.

FIG. 6B shows a method 60 of operating a client device at a time of viewing. The method 60 might be implemented in a client device such as, for example, the client device 44 (FIG. 4) as a set of logic/module instructions stored in a machine- or computer-readable medium of a memory such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated processing block 62 provides for obtaining a query image of a scene, wherein the query image represents the scene at a time of capture. Illustrated block 68 receives user input, wherein the user input identifies a different time than the time of capture. Illustrated block 70 provides for obtaining a time-shifted image based on the embedded information and the user input. Block 70 may also provide for personalizing the time-shifted image upon receipt. In one example, the time-shifted image is obtained from a time-shifted image server such as, for example, the servers 36, 38 (FIG. 3), already discussed.

Figure 7:
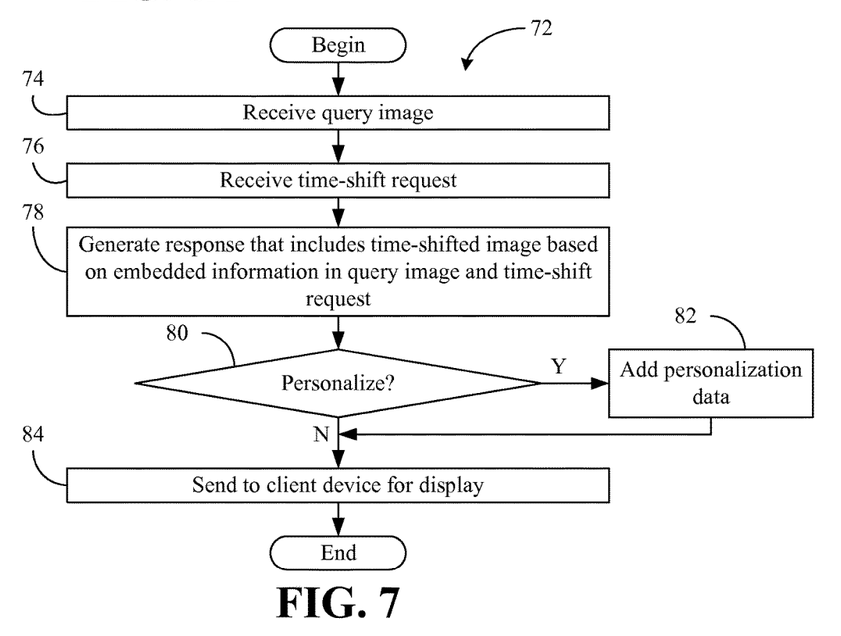
FIG. 7 is a flowchart of an example of a method of operating a time-shifted image server according to an embodiment.

FIG. 7 shows a method 72 of operating a time-shifted image server. The method 72 might be implemented in a server such as, for example, one or more of the severs 36, 38 (FIG. 3) as a set of logic/module instructions stored in a machine- or computer-readable medium of a memory such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated processing block 74 provides for receiving a query image of a scene, wherein the query image includes embedded information and represents the scene at a time of capture. In one example, the embedded information includes location data and perspective data, as already discussed. Block 76 may receive a time-shift request, wherein the time-shift request identifies a different time than the time of capture. A response may be generated at block 78, wherein the response includes a time-shifted image based on the query image and the time-shift request.

A determination may be made at block 80 as to whether the time-shifted image will be personalized. The determination at block 80 may take into consideration one or more user settings and/or authorization responses to user prompts. If personalization is authorized, illustrated block 82 adds personalization data to the time-shifted image by, for example, adding user selected faces, removing unknown faces, adding or deleting social networking comments and information from public and/or crowd sources, and so forth. Personalization may alternatively take place at the client device. The time-shifted image may be sent to the client device for display to the user at block 84.

Figure 8:
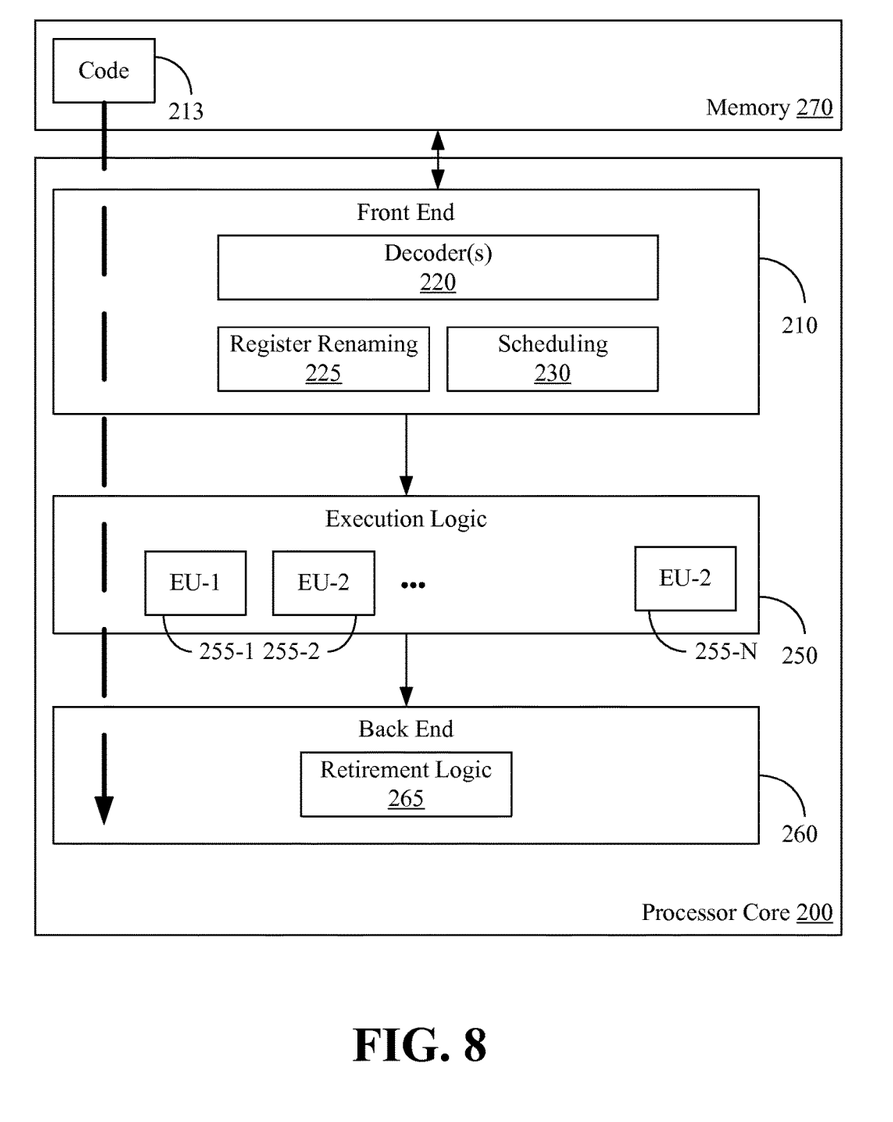
FIG. 8 is a block diagram of an example of a processor core according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the client device logic architecture 46 (FIG. 4) and/or the sever logic architecture 58 (FIG. 5), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include IO (input output) control logic and/or may include IO control logic integrated with memory control logic. The processing element may also include one or more caches.

Figure 9:
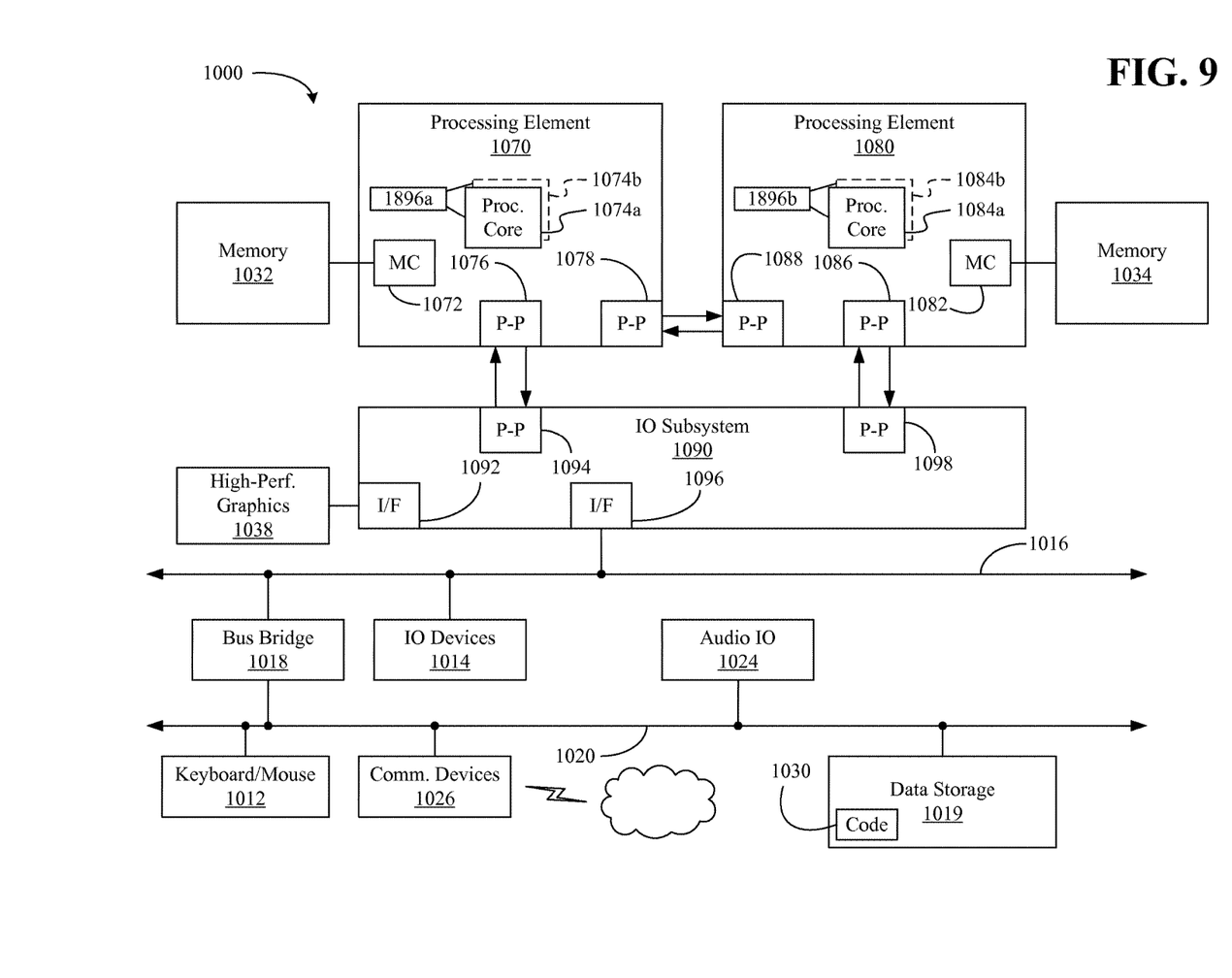
FIG. 9 is a block diagram of an example of a system according to an embodiment.

Referring now to FIG. 9, shown is a block diagram of a system 1000 embodiment. Shown in FIG. 9 is a multiprocessor system 1000 that includes a first processing element 1070 and a second processing element 1080. While two processing elements 1070 and 1080 are shown, it is to be understood that an embodiment of system 1000 may also include only one such processing element.

The system 1000 is illustrated as a point-to-point interconnect system, wherein the first processing element 1070 and second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074*a* and 1074*b* and processor cores 1084*a* and 1084*b*). Such cores 1074, 1074*b*, 1084*a*, 1084*b* may be configured to execute instruction code in a manner similar to that discussed above in connection with FIG. 8.

Each processing element 1070, 1080 may include at least one shared cache 1896. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an IO subsystem 1090 via P-P interconnects 1076, 1086 and 1084, respectively. As shown in FIG. 9, the IO subsystem 1090 includes P-P interfaces 1094 and 1098. Furthermore, IO subsystem 1090 includes an interface 1092 to couple 10 subsystem 1090 with a high performance graphics engine 1038. In one embodiment, the bus 1049 may be used to couple graphics engine 1038 to IO subsystem 1090. Alternately, a point-to-point interconnect 1039 may couple these components.

In turn, IO subsystem 1090 may be coupled to a first bus 1016 via an interface 1096. In one embodiment, the first bus 1016 may be a Peripheral Component Interconnect (PCI) bus, or a bus such as a PCI Express bus or another third generation IO interconnect bus, although the scope of the present invention is not so limited.

As shown in FIG. 9, various IO devices 1014 (e.g., image capture components) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. In one example, web content is received via the communication devices 1026. The code 1030 may include instructions for performing embodiments of one or more of the methods described above. Thus, the illustrated code 1030 may implement the client device logic architecture 46 (FIG. 4) and/or the server logic architecture 58 (FIG. 5), and may be similar to the code 213 (FIG. 8), already discussed. Further, an audio IO 1024 may be coupled to second bus 1020.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Techniques described herein may therefore enable images to be viewed with dynamically changing information in addition to being able to view them as they appeared at the time of capture. Accordingly, a "how it looks today" view or "how it looked at xyz time" solution may be achieved. The real-time service may be hosted with information maintained by a service provider as well as with information gathered through crowd sourcing. The information may be used to enhance the user's photograph as it is captured or when it is viewed later.

Notes and Additional Examples

Example one may include a method of time-shifting images that involves obtaining a query image of a scene, wherein the query image includes embedded information and represents the scene at a time of capture, and wherein the embedded information includes location data and perspective data. The method may further provide for receiving user input that identifies a different time than the time of capture, and obtaining a time-shifted image of the scene based on the user input and the embedded information in the query image, wherein the time-shifted image represents the scene at the different time.

Additionally, obtaining the query image in example one may include receiving the query image from one of a local data store and a local image capture component.

Additionally, if the query image in example one is received from the local image capture component, the method may further include adding the embedded information to the query image.

Moreover, example one may further include obtaining environmental data from one or more infrastructure sensors, wherein the embedded information further includes the environmental data, and wherein the environmental data includes one or more of temperature data, moisture data, ambient light intensity data and wind speed data.

In addition, example one may further include obtaining personalization data from one or more of a user interface and a crowd source interface, wherein the embedded information embedded further includes the personalization data.

In addition, example one may further include encrypting the embedded information.

Moreover, the different time of example one may be earlier than the time of capture.

Additionally, the different time of example one may be later than the time of capture and earlier than a time of viewing the query image.

Additionally, using the user input and the embedded information to obtain the time-shifted image in any one of the example one methods may include transmitting the query image with the embedded information to a remote server, transmitting a time-shift request to the remote server based on the user input, and receiving the time-shifted image from the remote server.

Example two may include at least one computer readable storage medium comprising a set of instructions which, when executed by a processor, cause a device to perform any one of the example one methods.

Example three may include an apparatus to time-shift images, wherein the apparatus includes a query module to obtain a query image of a scene, wherein the query image is to include embedded information and represent the scene at a time of capture, and wherein the embedded information is to include location data and perspective data. The apparatus may also include a user interface to receive user input that identifies a different time than the time of capture, and an image retrieval module to obtain a time-shifted image of the scene based on the user input and embedded information in the query image, wherein the time-shifted image represents the scene at the different time.

Additionally, the query module of example three may receive the query image from one of a local data store and a local image capture component.

Additionally, if the query image of example three is received from the local image capture component, the query module may add the embedded information to the query image.

Moreover, the query module of example three may obtain environmental data from one or more infrastructure sensors, wherein the embedded information is to further include the environmental data, and wherein the environmental data is to include one or more of temperature data, moisture data, ambient light intensity data and wind speed data.

In addition, the apparatus of example three may include a personalization module to obtain personalization data from one or more of a user interface and a crowd source interface, wherein the embedded information is to further include the personalization data.

In addition, the apparatus of example three may include an encryption module to encrypt the embedded information.

Moreover, the different time of example three may be earlier than the time of capture.

Additionally, the different time of example three may be later than the time of capture and earlier than a time of viewing the query image.

Additionally, the image retrieval module of any one of the example three apparatuses may transmit the query image with the embedded information to a remote server, transmit a time-shift request to the remote server based on the user input, and receive the time-shifted image from the remote server.

Example four may include an apparatus to time-shift images, wherein the apparatus includes means for performing any one of the example one methods.

Example five may include a method of serving time-shifted images that involves receiving a query image of a scene, wherein the query image includes embedded information and represents the scene at a time of capture, and wherein the embedded information includes location data and perspective data. The method may also provide for receiving a time-shift request, wherein the time-shift request identifies a different time than the time of capture, and generating a response that includes a time-shifted image based on the query image and the time-shift request.

Additionally, generating the response of the example five method may include using the embedded information to obtain the time-shifted image from one or more of a crowd source and a data store associated with a particular user.

Additionally, generating the response of the example five method may include combining a plurality of images to obtain the time-shifted image, and wherein the plurality of images includes the query image.

Moreover, generating the response of the example five method may include conducting an object recognition analysis on the query image, and removing one or more objects from the query image based on the object recognition analysis to obtain a personalized image, wherein the personalized image is used to obtain the time-shifted image.

In addition, the different time of any one of the example five methods may be earlier than the time of capture.

In addition, the different time of any one of the example five methods may be later than the time of capture.

Example six may include at least one computer readable storage medium comprising a set of instructions which, when executed by a processor, cause a computer to perform any one of the example five methods.

Example seven may include an apparatus to serve time-shifted images, wherein the apparatus includes a query module to receive a query image of a scene, wherein the query image is to include embedded information and represent the scene at a time of capture, and wherein the embedded information includes location data and perspective data. The query module may also receive a time-shift request, wherein the time-shift request is to identify a different time than the time of capture. The apparatus may also include an image delivery module to generate a response that includes a time-shifted image based on the query image and the time-shift request.

Additionally, the apparatus of example seven may include a crowd source interface to obtain the time-shifted image from one or more of a crowd source and a data store interface to obtain the time-shifted image from a data store associated with a particular user.

Additionally, the apparatus of example seven may include a combination module to combine a plurality of images to obtain the time-shifted image, and wherein the plurality of images is to include the query image.

Moreover, the apparatus of example seven may include a personalization module to conduct an object recognition analysis on the query image, and remove one or more objects from the query image based on the object recognition analysis to obtain a personalized image, wherein the personalized image is used to obtain the time-shifted image.

In addition, the different time of any one of the example seven apparatuses may be earlier than the time of capture.

In addition, the different time of any one of the example seven apparatuses may be later than the time of capture.

Example eight may include an apparatus to serve time-shifted images, wherein the apparatus includes means for performing any one of the example five methods.

Embodiments described herein are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
    obtaining a query image of a particular scene, wherein the query image includes embedded information and represents the particular scene at a time of capture and wherein obtaining the query image includes receiving the query image from one of a local data store and a local image capture component and wherein if the query image is received from the local image capture component, the method further includes adding the embedded information to the query image, and wherein the embedded information includes location data and perspective data wherein the perspective data is obtained from a local sensor of the device that captures the image data, the local sensor being selected from one or more of an accelerometer, a gyroscope, or a compass and wherein the embedded information further includes environmental data from one or more infrastructure sensors, and wherein the environmental data includes one or more of temperature data, moisture data, ambient light intensity data and wind speed data;

receiving user input that identifies a different time than the time of capture; and obtaining a time-shifted image of the particular scene based on the user input and the embedded information in the query image, wherein the time-shifted image represents the particular scene at the different time and wherein using the user input and the embedded information to obtain the time-shifted image includes:

transmitting the query image with the embedded information to a remote server;

transmitting a time-shift request to the remote server based on the user input; and receiving the time-shifted image having the location data from the remote server.

2. The method of claim 1, further including obtaining personalization data from one or more of a user interface and a crowd source interface, wherein the embedded information further includes the personalization data.

3. The method of claim 1, further including encrypting the embedded information.

4. The method of claim 1, wherein the different time is earlier than the time of capture.

5. The method of claim 1, wherein the different time is later than the time of capture and earlier than a time of viewing the query image.

6. At least one computer readable storage medium comprising a set of instructions which, when executed by a processor, cause a device to:

obtain a query image of a particular scene from one of a local data store and a local image capture component, wherein the query image is to include embedded information and represent the particular scene at a time of capture and wherein if the query image is received from the local image capture component, the instructions, when executed, add the embedded information to the query image, and wherein the embedded information is to include location data and perspective data wherein the perspective data is obtained from a local sensor of the device that captures the image data, the local sensor being selected from one or more of an accelerometer, a gyroscope, or a compass and wherein the embedded data is to further include environmental data that includes one or more of temperature data, moisture data, ambient light intensity data and wind speed data;

receive user input that identifies a different time than the time of capture; and obtain a time-shifted image of the particular scene based on the user input and embedded information in the query image, wherein the time-shifted image represents the particular scene at the different time; and wherein the instructions, when executed, further cause the device to:

transmit the query image with the embedded information to a remote server;

transmit a time-shift request to the remote server based on the user input; and receive the time-shifted image having the location data from the remote server.

7. The at least one computer readable storage medium of claim 6, wherein the instructions, when executed, cause the device to obtain personalization data from one or more of a user interface and a crowd source interface, wherein the embedded information is to further include the personalization data.

8. The at least one computer readable storage medium of claim 6, wherein the instructions, when executed, cause the device to encrypt the embedded information.

9. The at least one computer readable storage medium of claim 6, wherein the different time is to be earlier than the time of capture.

10. The at least one computer readable storage medium of claim 6, wherein the different time is to be later than the time of capture and earlier than a time of viewing the query image.

11. A method comprising:

receiving a query image of a particular scene, wherein the query image includes embedded information and represents the particular scene at a time of capture, and wherein the embedded information includes location data and perspective data wherein the perspective data is obtained from a local sensor of the device that captures the image data, the local sensor being selected from one or more of an accelerometer, a gyroscope, or a compass and wherein the embedded data is to further include environmental data that includes one or more of temperature data, moisture data, ambient light intensity data and wind speed data;

receiving a time-shift request, wherein the time-shift request identifies a different time than the time of capture; and generating a response that includes a time-shifted image of the particular scene based on the query image and the time-shift request wherein generating the response includes:

conducting an object recognition analysis on the query image; and removing one or more objects from the query image based on the object recognition analysis to obtain a personalized image, wherein the personalized image is used to obtain the time-shifted image having the location data associated with the query image.

12. The method of claim 11, wherein generating the response includes using the embedded information to obtain the time-shifted image from one or more of a crowd source and a data store associated with a particular user.

13. The method of claim 11, wherein generating the response includes combining a plurality of images to obtain the time-shifted image, and wherein the plurality of images includes the query image.

14. The method of claim 11, wherein the different time is earlier than the time of capture.

15. The method of claim 11, wherein the different time is later than the time of capture.

16. At least one computer readable storage medium comprising a set of instructions which, when executed by a processor, cause a computer to:

receive a query image of a particular scene, wherein the query image is to include embedded information and represent the particular scene at a time of capture, and wherein the embedded information includes location data and perspective data wherein the perspective data is obtained from a local sensor of the device that captures the image data, the local sensor being selected from one or more of an accelerometer, a gyroscope, or a compass and wherein the embedded data is to further include environmental data that includes one or more of temperature data, moisture data, ambient light intensity data and wind speed data;

receive a time-shift request, wherein the time-shift request is to identify a different time than the time of capture; and generate a response that includes a time-shifted image of the particular scene based on the query image and the time-shift request and wherein the instructions, when executed, further cause a computer to:

conduct an object recognition analysis on the query image; and remove one or more objects from the query image based on the object recognition analysis to obtain a personalized image, wherein the personalized image is used to obtain the time-shifted image having the location data associated with the query image.

17. The at least one computer readable storage medium of claim 16, wherein the instructions, when executed, cause a computer to use the embedded information to obtain the time-shifted image from one or more of a crowd source and a data store associated with a particular user.

18. The at least one computer readable storage medium of claim 16, wherein the instructions, when executed, cause a computer to combine a plurality of images to obtain the time-shifted image, and wherein the plurality of images is to include the query image.

19. The at least one computer readable storage medium of claim 16, wherein the different time is to be earlier than the time of capture.

20. The at least one computer readable storage medium of claim 16, wherein the different time is to be later than the time of capture.

21. An apparatus comprising:

a query module to obtain a query image of a particular scene, wherein the query image is to include embedded information and represent the particular scene at a time of capture and wherein the query module is to receive the query image from one of a local data store and a local image capture component and wherein if the query image is received from the local image capture component, the query module is to add the embedded information to the query image, and wherein the embedded information is to include location data and perspective data wherein the perspective data is obtained from a local sensor of the device that captures the image data, the local sensor being selected from one or more of an accelerometer, a gyroscope, or a compass and wherein the embedded data is to further include environmental data that includes one or more of temperature data, moisture data, ambient light intensity data and wind speed data;

user interface hardware to receive user input that identifies a different time than the time of capture; and an image retrieval module to:

transmit the query image with the embedded information to a remote server;

transmit a time-shift request to the remote server based on the user input; and receive a time-shifted image having the location associated with the query image from the remote server, wherein the time-shifted image represents the particular scene at the different time and wherein one or more of the query module or the image retrieval module are implemented at least partly in fixed functionality logic hardware.

* * * * *